(12) United States Patent
Huang

(10) Patent No.: US 8,617,664 B2
(45) Date of Patent: *Dec. 31, 2013

(54) MULTI-POLYMER GRIP MEMBER

(76) Inventor: Ben Huang, Huntington Beach, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/208,297

(22) Filed: Aug. 11, 2011

(65) Prior Publication Data

US 2011/0293902 A1    Dec. 1, 2011

Related U.S. Application Data

(63) Continuation of application No. 12/055,289, filed on Mar. 25, 2008, now Pat. No. 8,003,171, which is a continuation of application No. 11/438,808, filed on May 22, 2006, now Pat. No. 7,347,792.

(51) Int. Cl.
*B05D 3/00* (2006.01)
*B05D 3/10* (2006.01)
*B05D 1/36* (2006.01)
*A63B 53/14* (2006.01)

(52) U.S. Cl.
USPC ..................................... 427/407.1; 473/300

(58) Field of Classification Search
USPC ........................................................ 473/300
See application file for complete search history.

(56) References Cited

U.S. PATENT DOCUMENTS

| | | | |
|---|---|---|---|
| 571,025 A | 11/1896 | Spamer | |
| 834,711 A | 10/1906 | Clarke et al. | |
| 979,266 A | 12/1910 | Dean | |
| 1,008,604 A | 11/1911 | Lake | |
| 1,017,565 A | 2/1912 | Lard | |
| 1,139,843 A | 5/1915 | Brown | |
| 1,345,505 A | 7/1920 | Persons | |

(Continued)

FOREIGN PATENT DOCUMENTS

| CN | 2090283 | 12/1991 |
|---|---|---|
| CN | 2109404 U | 7/1992 |

(Continued)

OTHER PUBLICATIONS

Zosel, Colloid and Polymer Science, 263,1985,541-553.*

(Continued)

*Primary Examiner* — James Lin
*Assistant Examiner* — Francisco Tschen
(74) *Attorney, Agent, or Firm* — Knobbe Martens Olson & Bear LLP

(57) ABSTRACT

A grip member and a method of making such a grip member including at least a polymerized region with two or more polymers. The first and second polymers cooperate to each form a portion of the top surface of the region. The region may be combined with a substrate to form a sheet. The sheet may be formed into a grip interface having any of a number of shapes including a panel shape. In the case of a panel shaped grip interface, the panel can then be attached to an underlisting sleeve to form the grip. Some versions of such a grip reduce impact shock and provide a feeling of tackiness in the manner of a spirally wrapped polyurethane-felt grip while allowing the use of multiple colors being polymerized together. The grip may be easily installed onto a golf club shaft and may further accommodate the use of polymers including various different characteristics including level of tackiness or durometer.

13 Claims, 13 Drawing Sheets

(56) References Cited

U.S. PATENT DOCUMENTS

| | | |
|---|---|---|
| 1,435,088 A | 11/1922 | Smith |
| 1,480,056 A | 1/1924 | Flint |
| 1,522,635 A | 1/1924 | Kraeuter |
| 1,528,190 A | 3/1925 | Howe |
| 1,617,972 A | 2/1927 | Wallace |
| 1,701,856 A | 2/1929 | Kraeuter |
| 1,890,037 A | 11/1930 | Johnson |
| 1,943,399 A | 1/1934 | Smith |
| 2,000,295 A | 5/1935 | Oldham |
| 2,086,062 A | 7/1937 | Bray |
| 2,103,889 A | 12/1937 | Brisick |
| 2,115,119 A | 4/1938 | Park |
| 2,149,911 A | 3/1939 | East |
| 2,206,056 A | 7/1940 | Sheesley |
| 2,221,421 A | 11/1940 | Curry |
| 2,225,839 A | 12/1940 | Moore |
| 2,449,575 A | 9/1948 | Wilhelm |
| 2,523,637 A | 9/1950 | Stanfield et al. |
| 2,671,660 A | 3/1954 | Goodwin |
| 2,690,338 A | 9/1954 | Brocke |
| 2,772,090 A | 11/1956 | Brandon |
| 2,934,285 A | 4/1960 | Niehaus |
| 2,984,486 A | 5/1961 | Jones |
| 3,028,283 A | 4/1962 | Lundgren et al. |
| 3,059,816 A | 10/1962 | Goldstein |
| 3,073,055 A | 1/1963 | Edwards et al. |
| 3,087,729 A | 4/1963 | Sullivan |
| 3,095,198 A | 6/1963 | Gasche |
| 3,140,873 A | 7/1964 | Goodwin |
| 3,157,723 A | 11/1964 | Hochberg |
| 3,252,706 A | 5/1966 | Rosasco, Sr. |
| 3,266,966 A | 8/1966 | Patchell |
| 3,311,375 A | 3/1967 | Onions |
| 3,366,384 A | 1/1968 | Lamkin et al. |
| 3,368,811 A | 2/1968 | Finney |
| 3,503,784 A | 3/1970 | Okayama et al. |
| 3,606,325 A | 9/1971 | Lamkin et al. |
| 3,697,315 A | 10/1972 | Mine |
| 3,857,745 A | 12/1974 | Grausch et al. |
| 3,876,320 A | 4/1975 | Phillipson |
| 3,922,402 A | 11/1975 | Shimamura et al. |
| 3,973,348 A | 8/1976 | Shell |
| 3,992,021 A | 11/1976 | Tobin |
| 4,012,039 A | 3/1977 | Yerke |
| 4,015,851 A | 4/1977 | Pennell |
| 4,052,061 A | 10/1977 | Stewart |
| 4,133,529 A | 1/1979 | Gambino |
| 4,137,360 A | 1/1979 | Reischl |
| 4,216,251 A | 8/1980 | Nishimura et al. |
| 4,284,275 A | 8/1981 | Fletcher |
| 4,347,280 A | 8/1982 | Lau et al. |
| 4,358,499 A | 11/1982 | Hill |
| 4,373,718 A | 2/1983 | Schmidt |
| 4,448,922 A | 5/1984 | McCartney |
| 4,453,332 A | 6/1984 | Wightman |
| 4,535,649 A | 8/1985 | Stahel |
| 4,582,459 A | 4/1986 | Benit |
| 4,613,537 A | 9/1986 | Krüpper |
| 4,651,991 A | 3/1987 | McDuff |
| 4,662,415 A | 5/1987 | Proutt |
| 4,765,856 A | 8/1988 | Doubt |
| 4,878,667 A | 11/1989 | Tosti |
| 4,919,420 A | 4/1990 | Sato |
| 4,941,232 A | 7/1990 | Decker et al. |
| 4,971,837 A | 11/1990 | Martz et al. |
| 5,024,866 A | 6/1991 | Goode |
| 5,055,340 A | 10/1991 | Matsumura et al. |
| 5,118,107 A | 6/1992 | Bucher |
| 5,123,646 A | 6/1992 | Overby et al. |
| 5,127,650 A | 7/1992 | Schneller |
| 5,261,665 A | 11/1993 | Downey |
| 5,322,290 A * | 6/1994 | Minami ................ 473/201 |
| 5,343,776 A | 9/1994 | Falco |
| 5,374,059 A | 12/1994 | Huang |
| 5,396,727 A | 3/1995 | Furuya et al. |
| 5,427,376 A | 6/1995 | Cummings et al. |
| 5,469,601 A | 11/1995 | Jackson |
| 5,474,802 A | 12/1995 | Shimoda et al. |
| 5,480,146 A | 1/1996 | Comer |
| 5,485,996 A | 1/1996 | Niksich |
| 5,511,445 A | 4/1996 | Hildebrandt |
| 5,523,125 A | 6/1996 | Kennedy et al. |
| 5,537,773 A | 7/1996 | Matsubara et al. |
| 5,570,884 A | 11/1996 | Carps |
| 5,571,050 A | 11/1996 | Huang |
| 5,577,722 A | 11/1996 | Glassberg |
| 5,584,482 A | 12/1996 | Huang |
| 5,595,544 A | 1/1997 | Roelke |
| 5,611,533 A | 3/1997 | Williams |
| 5,624,116 A | 4/1997 | Yeh |
| 5,626,527 A | 5/1997 | Eberlein |
| 5,634,859 A | 6/1997 | Nesbitt |
| 5,645,501 A | 7/1997 | Huang |
| 5,671,923 A | 9/1997 | Huang |
| 5,690,566 A | 11/1997 | Bracho |
| 5,695,418 A | 12/1997 | Huang |
| 5,730,662 A | 3/1998 | Rens |
| 5,730,669 A | 3/1998 | Huang |
| 5,753,568 A | 5/1998 | Shimano et al. |
| 5,772,524 A | 6/1998 | Huang |
| 5,781,963 A | 7/1998 | Maru et al. |
| 5,797,813 A | 8/1998 | Huang |
| 5,803,828 A | 9/1998 | Huang |
| 5,813,921 A | 9/1998 | Huang |
| 5,816,933 A | 10/1998 | Huang |
| 5,816,934 A | 10/1998 | Huang |
| 5,827,129 A | 10/1998 | Huang |
| 5,839,983 A | 11/1998 | Kramer |
| 5,851,632 A | 12/1998 | Chen et al. |
| 5,857,929 A | 1/1999 | Huang |
| 5,867,868 A | 2/1999 | Ward |
| 5,890,260 A | 4/1999 | Gaunt |
| 5,890,972 A | 4/1999 | Huang |
| 5,895,329 A | 4/1999 | Huang |
| 5,910,054 A | 6/1999 | Huang |
| 5,924,941 A | 7/1999 | Hagey |
| 5,997,421 A | 12/1999 | Huang |
| 6,036,607 A | 3/2000 | Finegan |
| 6,048,275 A | 4/2000 | Gedeon |
| 6,148,482 A | 11/2000 | Maraman, Jr. |
| 6,197,392 B1 | 3/2001 | Jones |
| 6,226,836 B1 | 5/2001 | Yasui |
| 6,244,975 B1 | 6/2001 | Huang |
| 6,261,191 B1 | 7/2001 | Chen |
| 6,314,617 B1 | 11/2001 | Hastings |
| 6,360,475 B1 | 3/2002 | Lepage et al. |
| 6,361,450 B1 | 3/2002 | Huang |
| 6,386,989 B1 | 5/2002 | Huang |
| D463,520 S | 9/2002 | Ulrich |
| 6,449,803 B1 | 9/2002 | McConchie |
| 6,503,153 B2 | 1/2003 | Wang |
| 6,506,128 B1 | 1/2003 | Bloom, Jr. |
| 6,511,732 B1 | 1/2003 | Chao |
| 6,551,198 B2 | 4/2003 | Huang |
| 6,558,270 B2 | 5/2003 | Kwitek |
| 6,627,027 B2 | 9/2003 | Huang |
| 6,629,382 B2 | 10/2003 | Irrgang et al. |
| 6,629,901 B2 | 10/2003 | Huang |
| 6,635,688 B2 | 10/2003 | Simpson |
| 6,652,398 B2 | 11/2003 | Falone et al. |
| 6,656,054 B2 | 12/2003 | Ulrich |
| 6,656,057 B2 | 12/2003 | Manual et al. |
| 6,663,500 B2 | 12/2003 | Huang |
| 6,666,777 B1 | 12/2003 | Falone et al. |
| 6,676,534 B2 | 1/2004 | Huang |
| 6,695,713 B2 | 2/2004 | Huang |
| 6,709,346 B1 | 3/2004 | Wang |
| 6,733,401 B1 | 5/2004 | Huang |
| 6,762,243 B2 | 7/2004 | Stender et al. |
| 6,827,656 B1 | 12/2004 | Hoeflich et al. |
| 6,843,732 B1 | 1/2005 | Huang |
| 6,857,971 B2 | 2/2005 | Huang |
| 6,908,400 B2 | 6/2005 | Chu et al. |
| 6,973,750 B1 | 12/2005 | Kim |

(56) References Cited

U.S. PATENT DOCUMENTS

| | | |
|---|---|---|
| 6,974,626 B2 | 12/2005 | Horacek |
| 7,008,582 B2 | 3/2006 | Chen |
| 7,025,690 B2 | 4/2006 | Nam |
| 7,048,644 B2 | 5/2006 | Wang |
| 7,137,904 B2 | 11/2006 | Huang |
| 7,140,973 B2 | 11/2006 | Rohrer |
| D534,602 S | 1/2007 | Norton et al. |
| D534,603 S | 1/2007 | Norton et al. |
| D534,604 S | 1/2007 | Norton et al. |
| D534,605 S | 1/2007 | Norton et al. |
| D534,607 S | 1/2007 | Norton et al. |
| D534,975 S | 1/2007 | Norton et al. |
| D536,048 S | 1/2007 | Chen |
| D538,868 S | 3/2007 | Norton et al. |
| D538,869 S | 3/2007 | Wang et al. |
| 7,186,189 B2 | 3/2007 | Huang |
| 7,195,568 B2 | 3/2007 | Huang |
| 7,219,395 B2 | 5/2007 | Bigolin |
| 7,344,447 B2 | 3/2008 | Chang |
| 7,344,448 B2 | 3/2008 | Huang |
| 7,347,792 B2 | 3/2008 | Huang |
| 7,374,498 B2 | 5/2008 | Huang |
| 7,404,770 B2 | 7/2008 | Huang |
| 7,438,646 B2 | 10/2008 | Huang |
| 7,448,957 B2 | 11/2008 | Huang |
| 7,448,958 B2 | 11/2008 | Huang |
| 7,458,903 B2 | 12/2008 | Wang et al. |
| 7,470,199 B2 | 12/2008 | Huang |
| 7,491,133 B2 | 2/2009 | Huang |
| 7,527,564 B2 | 5/2009 | Huang |
| 7,566,375 B2 | 7/2009 | Huang |
| 7,585,230 B2 | 9/2009 | Huang |
| 7,770,321 B2 | 8/2010 | Huang |
| 7,862,445 B2 | 1/2011 | Huang |
| 7,862,446 B2 | 1/2011 | Huang |
| 7,980,961 B2 | 7/2011 | Huang |
| 7,985,314 B2 | 7/2011 | Huang |
| 8,003,171 B2 * | 8/2011 | Huang ........................ 427/407.1 |
| 2001/0046905 A1 * | 11/2001 | Huang ........................ 473/300 |
| 2002/0028325 A1 | 3/2002 | Simpson |
| 2002/0142858 A1 | 10/2002 | Chen |
| 2002/0142900 A1 | 10/2002 | Wang |
| 2002/0151373 A1 | 10/2002 | Beauregard |
| 2002/0173371 A1 | 11/2002 | Lamkin et al. |
| 2003/0032495 A1 * | 2/2003 | Huang ........................ 473/300 |
| 2003/0040384 A1 | 2/2003 | Falone et al. |
| 2003/0045370 A1 | 3/2003 | Jaw |
| 2003/0062654 A1 | 4/2003 | Lamkin |
| 2003/0139223 A1 | 7/2003 | Ulrich et al. |
| 2003/0148836 A1 | 8/2003 | Falone et al. |
| 2003/0150081 A1 | 8/2003 | Wang |
| 2003/0216192 A1 | 11/2003 | Chu |
| 2003/0228930 A1 | 12/2003 | Huang |
| 2004/0029645 A1 | 2/2004 | Chen |
| 2004/0029646 A1 | 2/2004 | Chu et al. |
| 2004/0031128 A1 | 2/2004 | Chen |
| 2004/0109980 A1 | 6/2004 | Chen et al. |
| 2004/0123429 A1 | 7/2004 | Wang |
| 2004/0185958 A1 * | 9/2004 | Huang ........................ 473/300 |
| 2004/0248664 A1 | 12/2004 | Billings |
| 2004/0266546 A1 | 12/2004 | Huang |
| 2005/0123723 A1 | 6/2005 | Wang |
| 2005/0148401 A1 | 7/2005 | Huang |
| 2005/0229285 A1 | 10/2005 | Chung |
| 2005/0276925 A1 | 12/2005 | Su |
| 2005/0287329 A1 | 12/2005 | Lai |
| 2006/0172815 A1 | 8/2006 | Chu |
| 2006/0252571 A1 | 11/2006 | Wang |
| 2006/0264268 A1 | 11/2006 | Huang |
| 2006/0287123 A1 | 12/2006 | Wang |
| 2007/0149307 A1 | 6/2007 | Huang |
| 2008/0039226 A1 | 2/2008 | Chi |
| 2008/0120893 A1 | 5/2008 | Keys et al. |
| 2008/0172839 A1 | 7/2008 | Wang |
| 2009/0258721 A1 | 10/2009 | Huang |
| 2009/0258722 A1 | 10/2009 | Huang |
| 2010/0022322 A1 | 1/2010 | Huang |
| 2010/0260987 A1 | 10/2010 | Huang |
| 2010/0269626 A1 | 10/2010 | Huang |
| 2010/0273568 A1 | 10/2010 | Huang |
| 2010/0281754 A1 | 11/2010 | Huang |
| 2011/0053704 A1 | 3/2011 | Huang |
| 2011/0065524 A1 | 3/2011 | Huang |
| 2011/0077100 A1 | 3/2011 | Huang |
| 2011/0113673 A1 | 5/2011 | Huang |

FOREIGN PATENT DOCUMENTS

| | | |
|---|---|---|
| CN | 2139008 Y | 7/1993 |
| CN | 2163667 Y | 5/1994 |
| CN | 2288744 | 8/1998 |
| CN | 1332022 A | 7/2000 |
| CN | 2438768 | 7/2001 |
| CN | 2444645 | 8/2001 |
| CN | ZL 02254450 | 9/2002 |
| CN | 2566903 Y | 8/2003 |
| CN | 2596752 Y | 1/2004 |
| CN | 2659497 Y | 12/2004 |
| DE | 36 44 674 A1 | 7/1988 |
| DE | 92 18 550 U1 | 8/1994 |
| FR | 2 731 402 A3 | 9/1996 |
| GB | 2 192 550 A | 1/1988 |
| JP | 53-12061 | 2/1978 |
| JP | 55-43008 | 3/1980 |
| JP | 60-61067 | 4/1985 |
| JP | 3112575 | 5/1991 |
| JP | 7-41731 | 2/1995 |
| JP | 3076015 | 12/2000 |
| JP | 3081404 | 8/2001 |
| JP | 2002-028264 | 1/2002 |

OTHER PUBLICATIONS

European Search Report, European Application No. 06254237.8, 7 pages, dated Jun. 18, 2008.
The Random House College Dictionary, Revised Edition, 1975, p. 1233, definition of skive.
Pending U.S. Appl. No. 12/848,052, filed Jul. 30, 2010
Pending U.S. Appl. No. 13/403,764, filed Feb. 23, 2012.
Pending Design U.S. Appl. No. 29/416,672, filed Mar. 26, 2012.
Pending U.S. Appl. No. 13/526,323, filed Jun. 18, 2012.
Pending Design U.S. Appl. No. 29/436,610, filed Nov. 7, 2012.

* cited by examiner

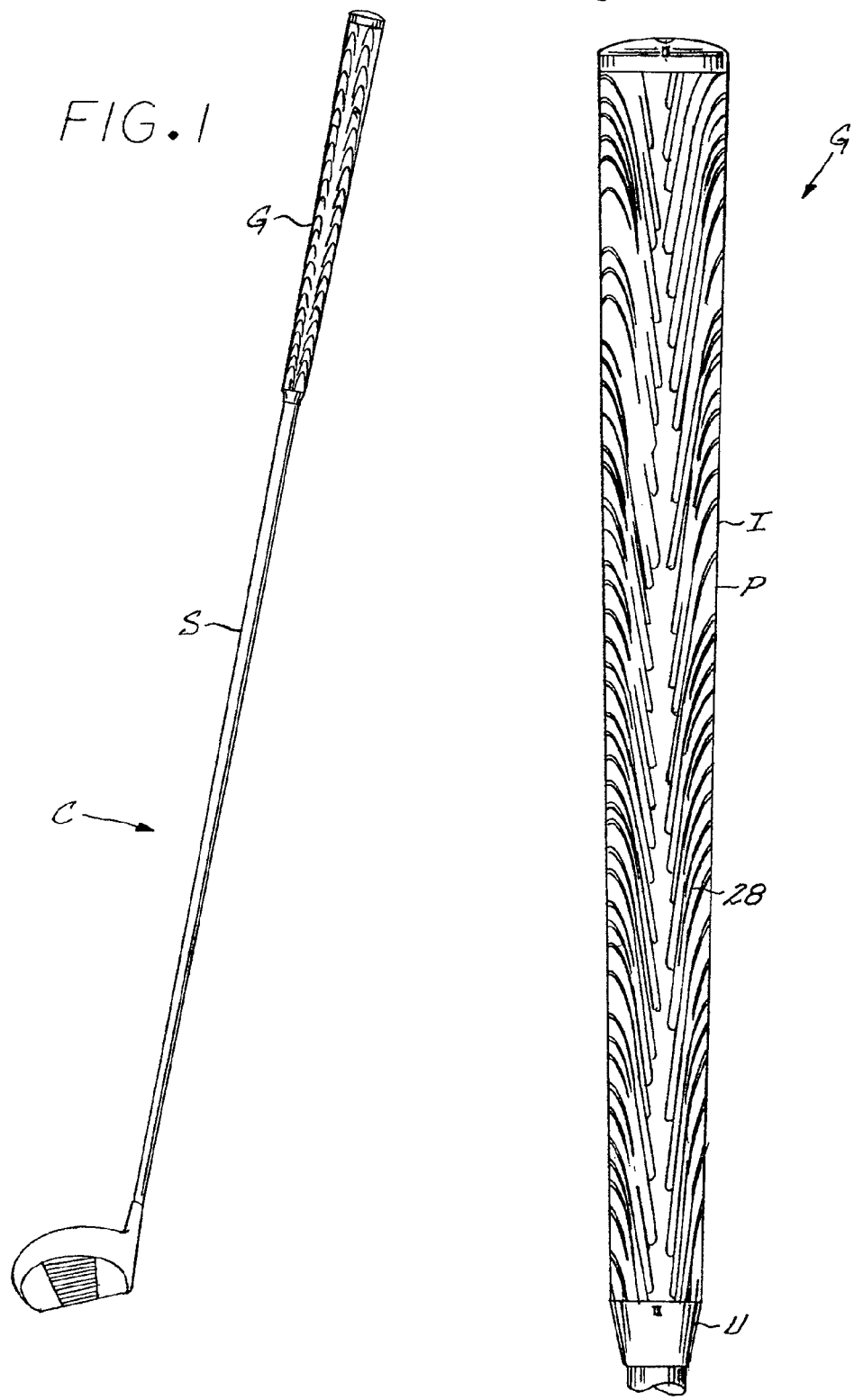

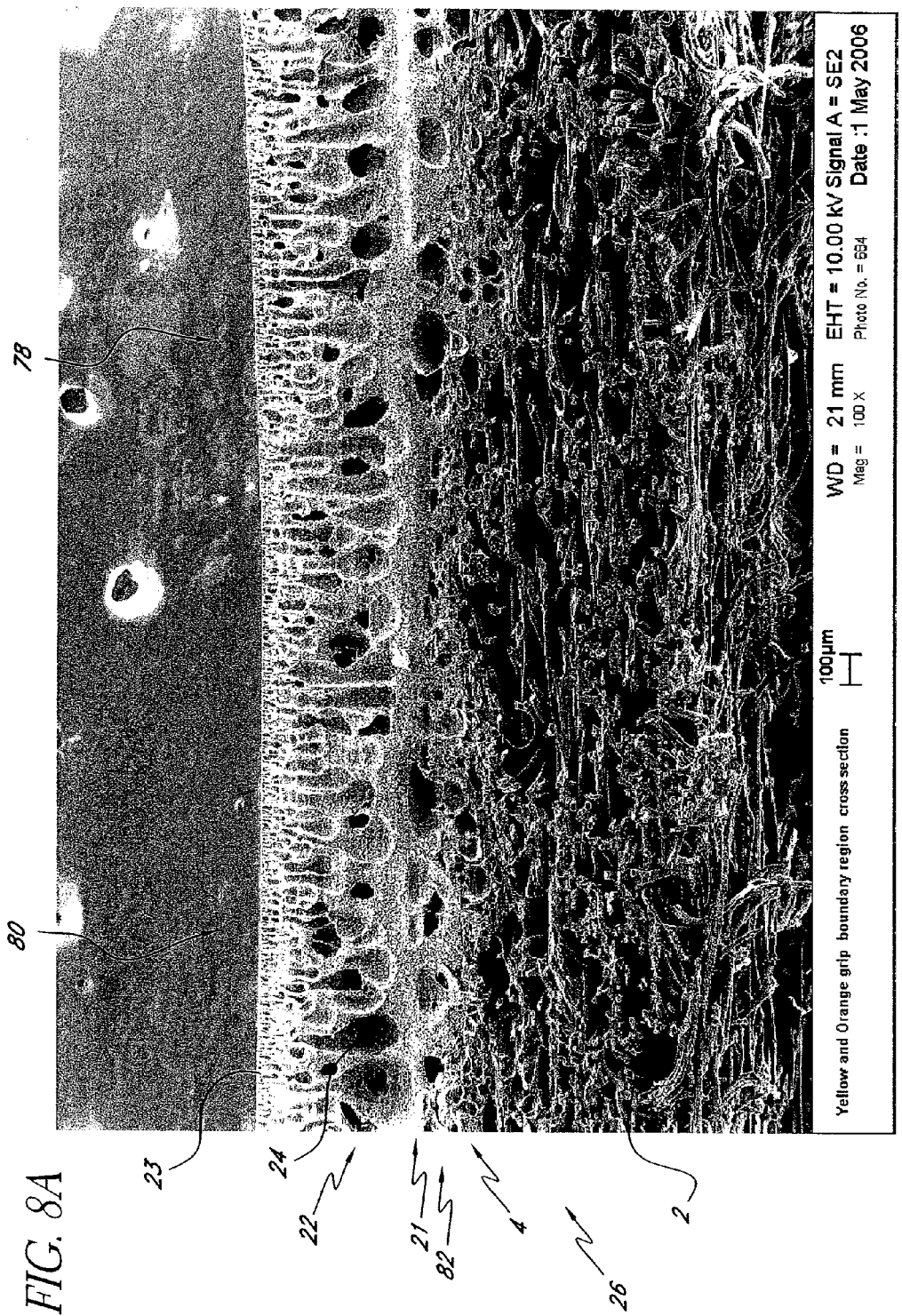

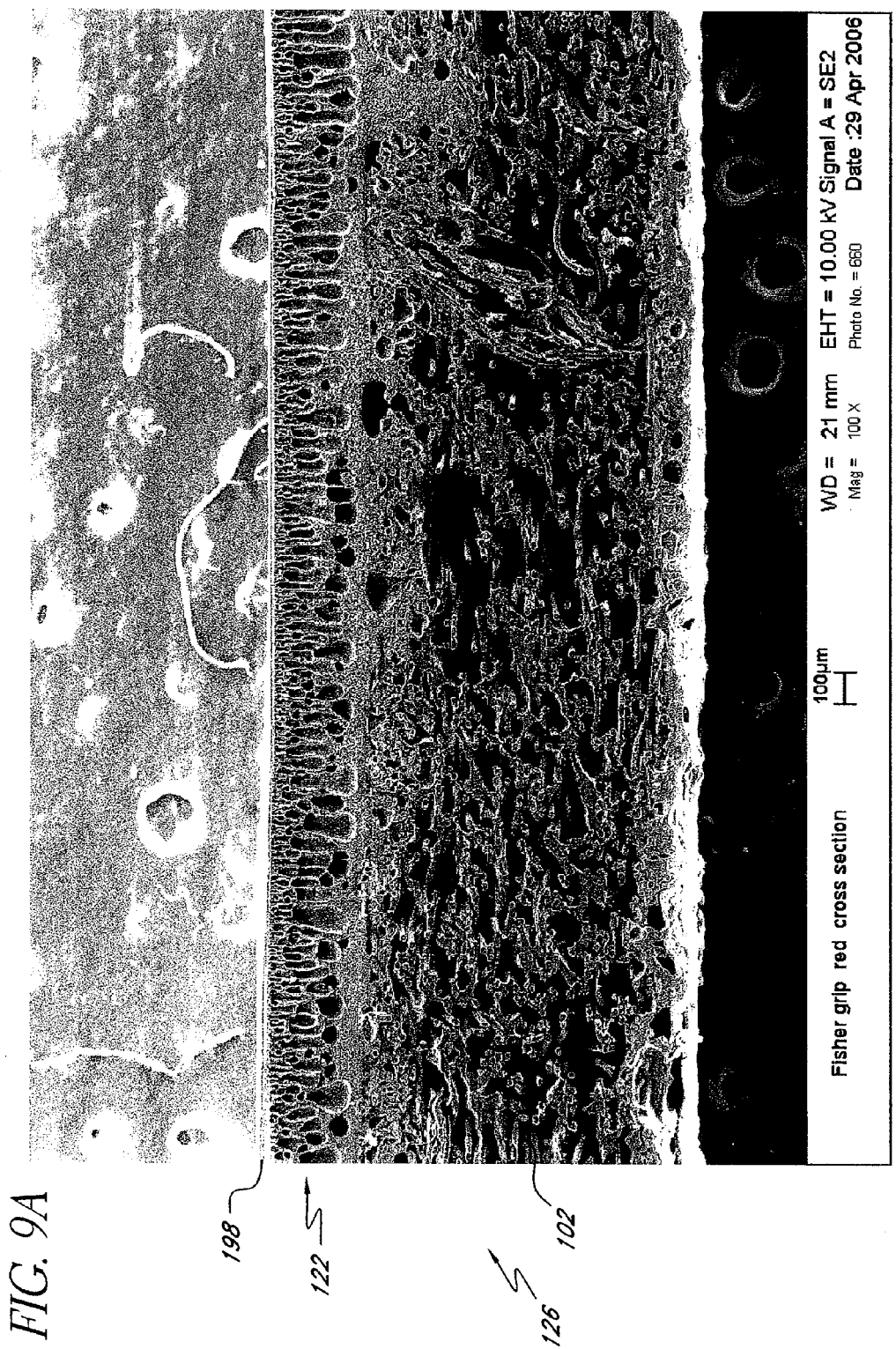

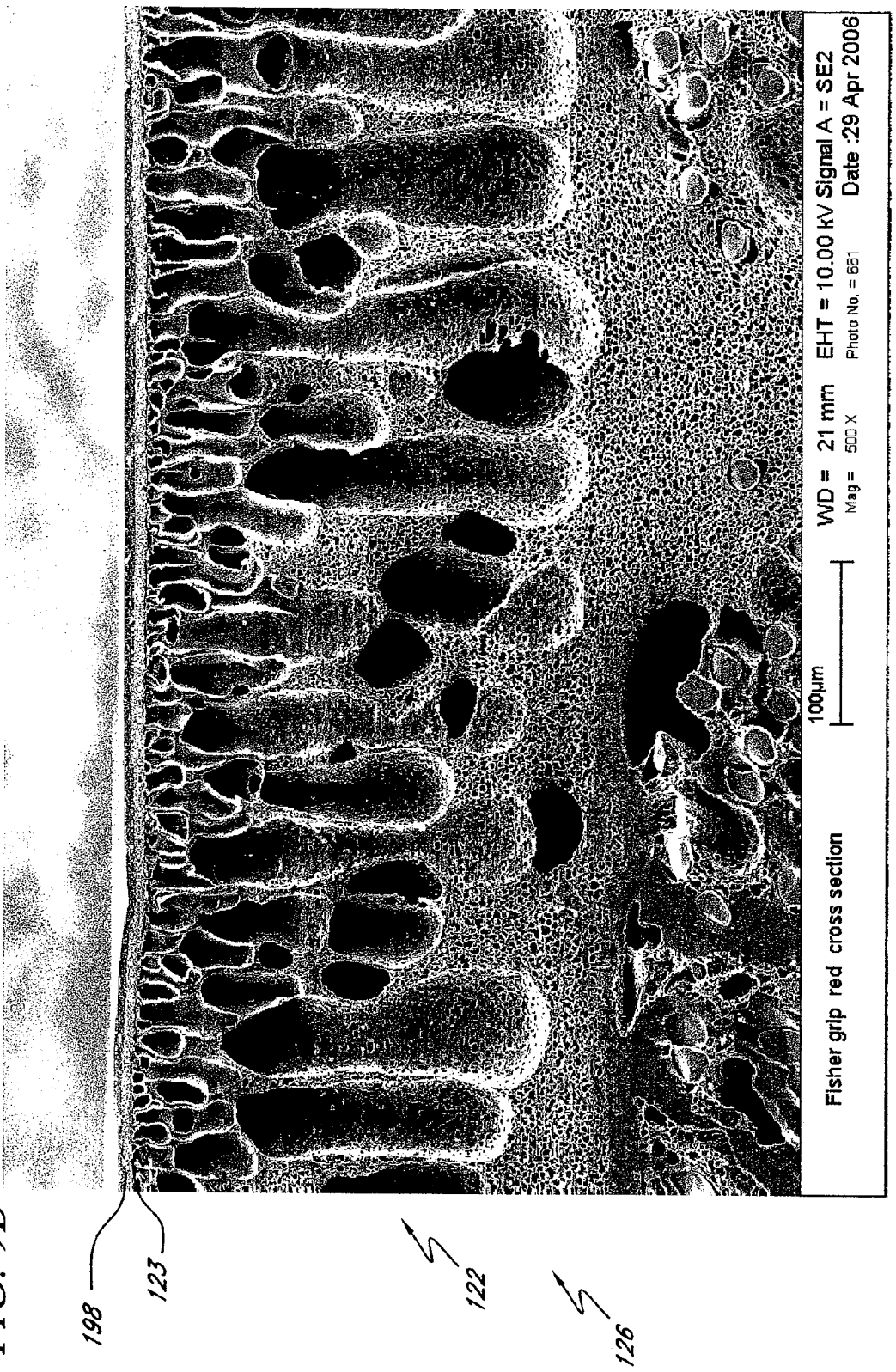

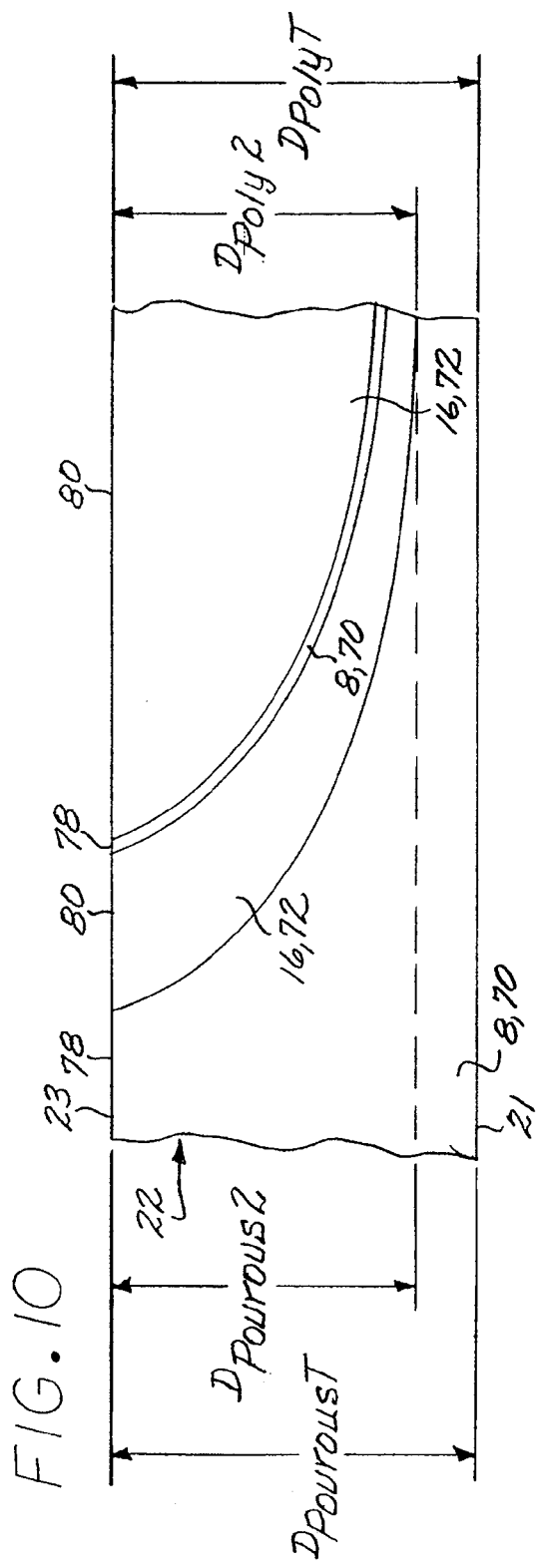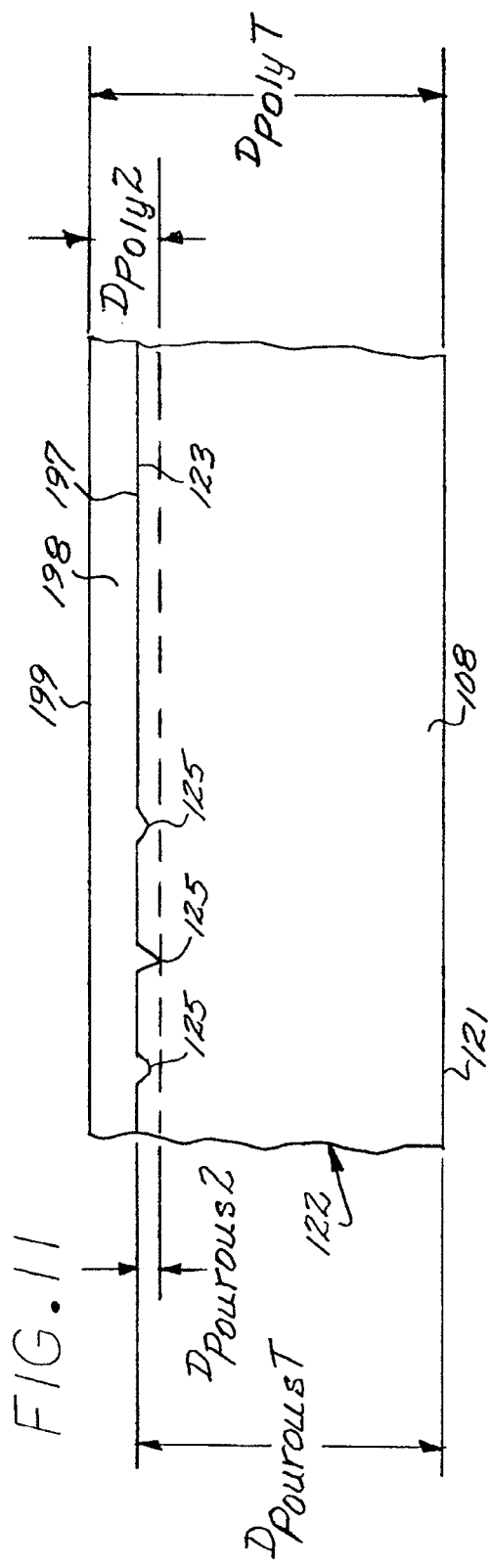

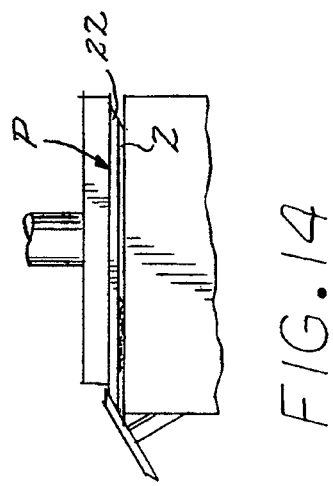
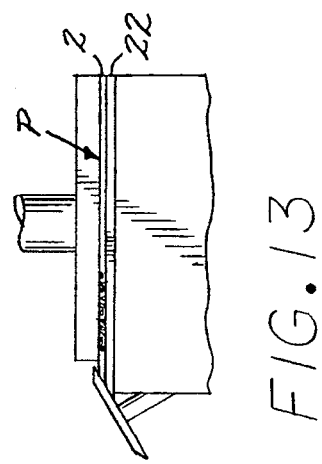
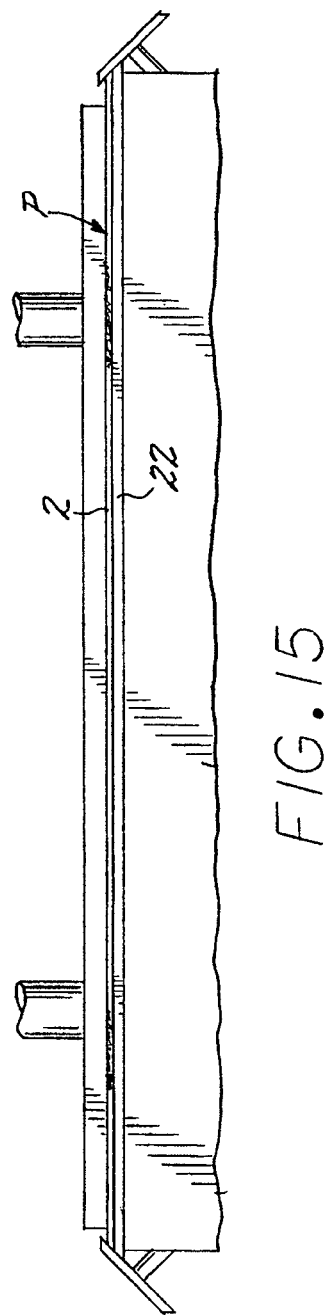
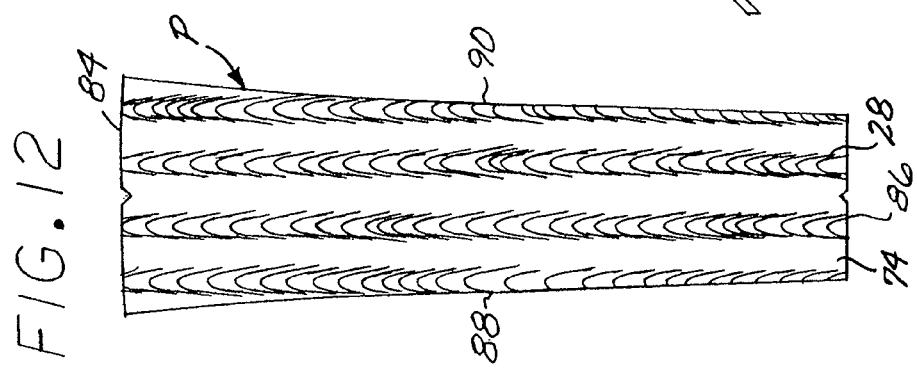

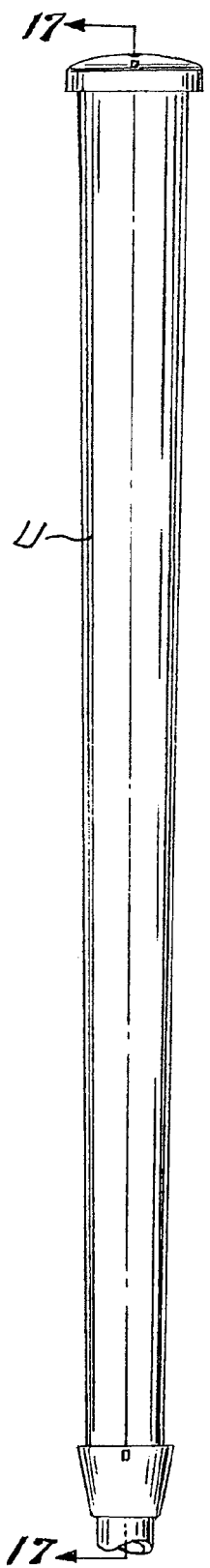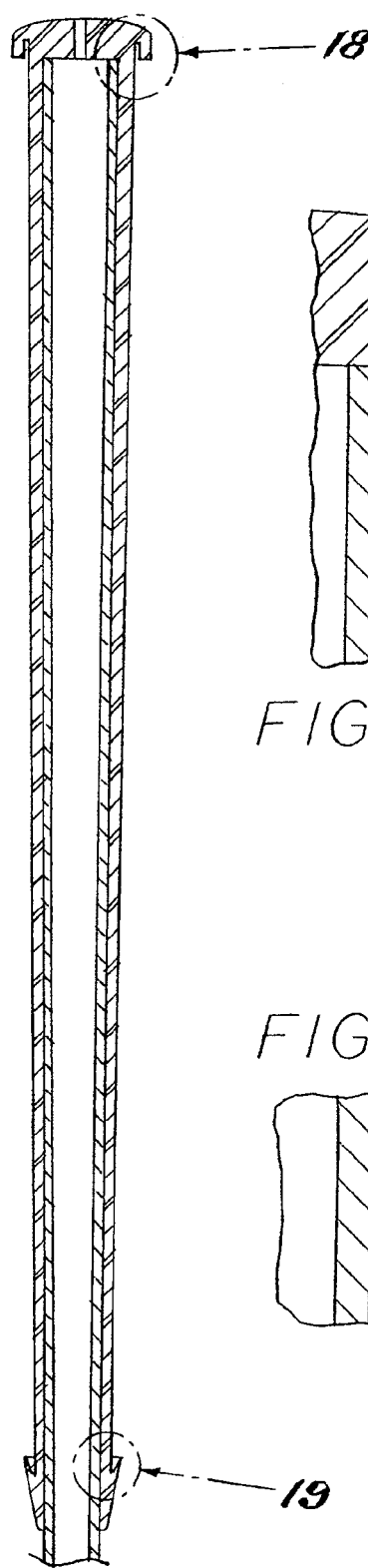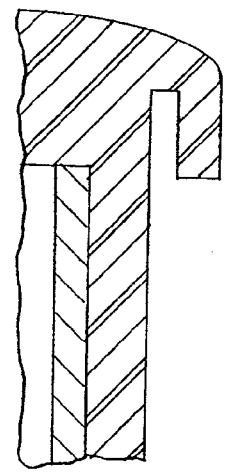
FIG. 18
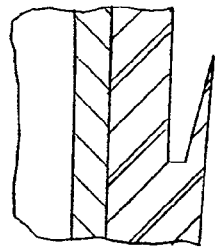
FIG. 19
FIG. 16  FIG. 17

FIG. 20
FIG. 21
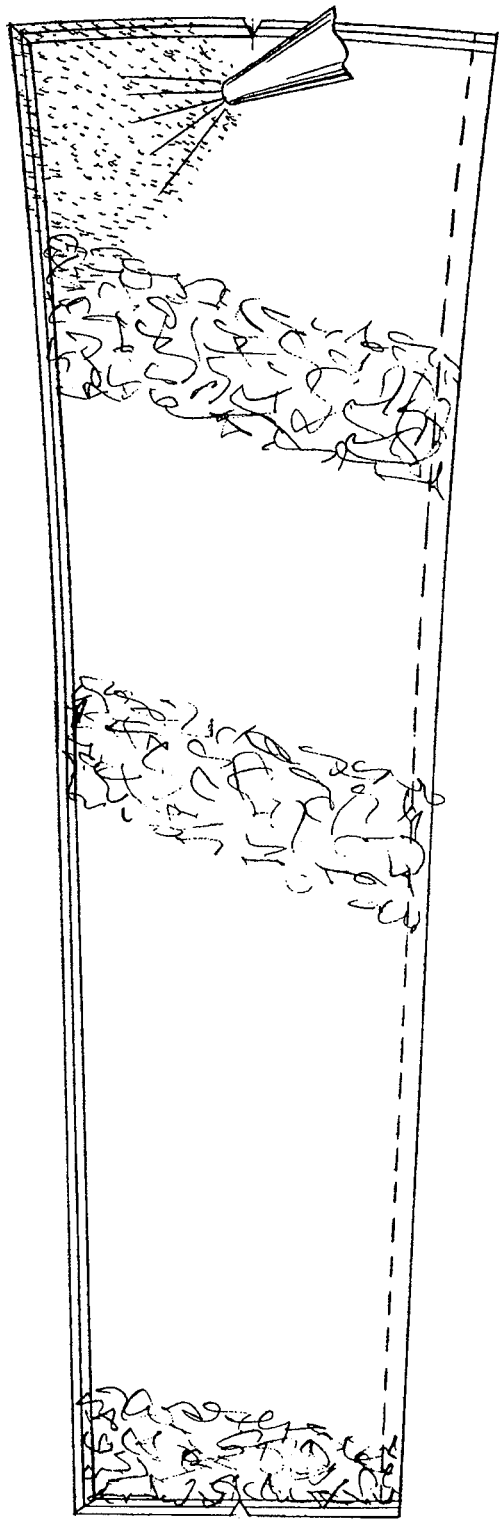
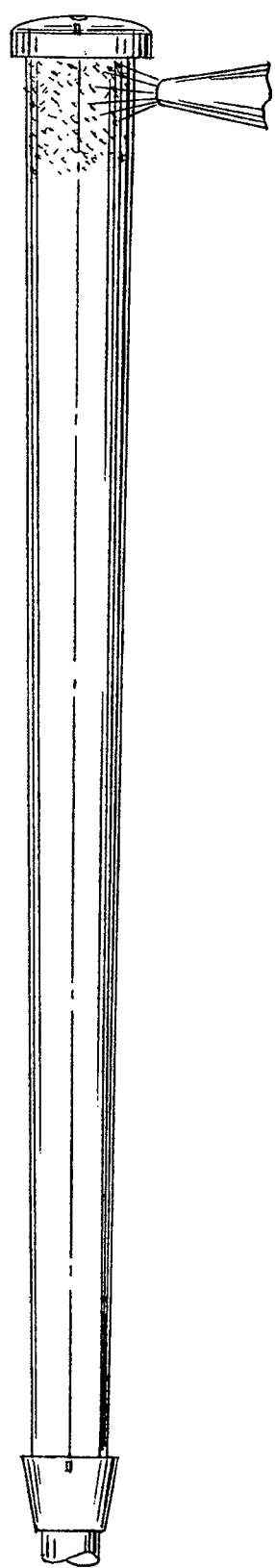

FIG. 22
FIG. 23
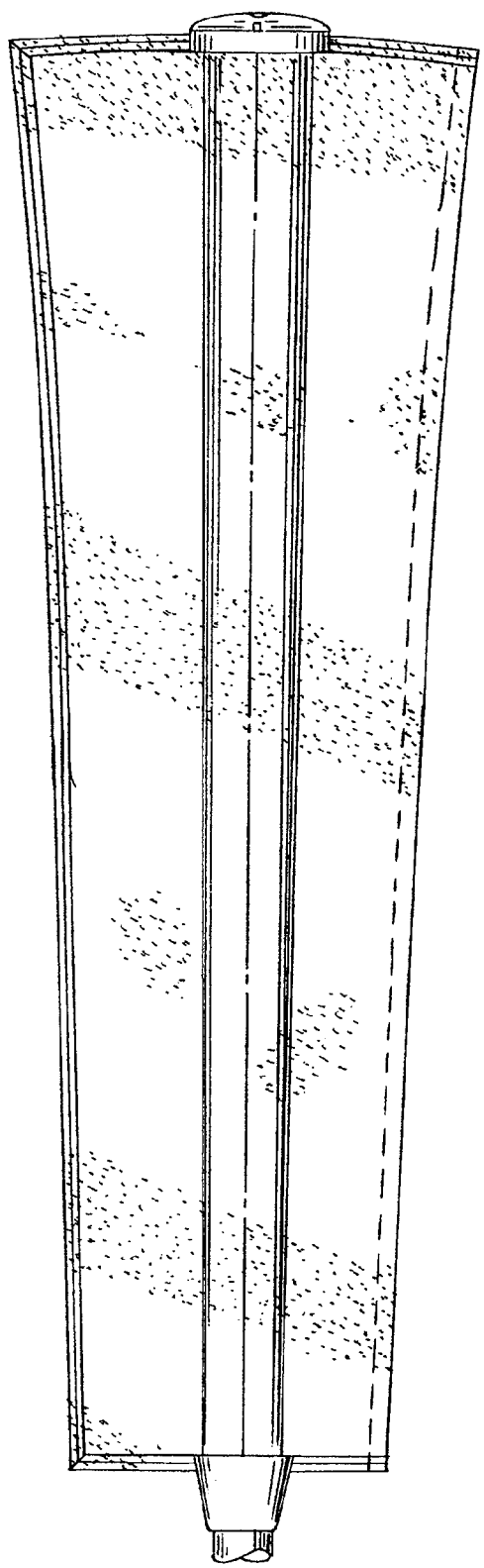
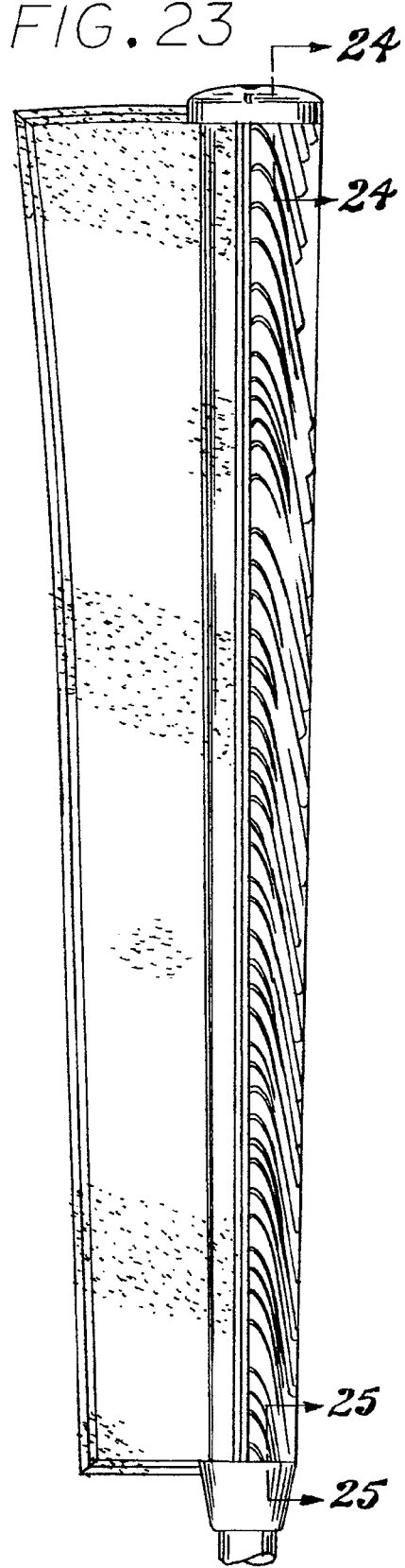

MULTI-POLYMER GRIP MEMBER

CROSS-REFERENCE TO RELATED APPLICATIONS

This application is a continuation application of U.S. patent application Ser. No. 12/055,289, filed Mar. 25, 2008, pending, which is a continuation of U.S. patent application Ser. No. 11/438,808, filed May 22, 2006, now U.S. Pat. No. 7,347,792.

BACKGROUND OF THE INVENTION

1. Incorporation by Reference

This application hereby incorporates by reference U.S. patent application Ser. No. 12/055,289, pending, and U.S. Pat. Nos. 7,566,375, 7,448,958, 7,448,957, 5,797,813, 6,676,534, 6,244,975, 6,627,027, 6,695,713, 6,843,732, 6,857,971, 7,186,189, and 7,347,792, each in its entirety.

2. Field of the Invention

This application relates to an improved grip for shafts. In particular, this application relates to an improved grip for the shafts of golf clubs.

3. Description of the Related Art

Applicant has previously developed resilient grips which successfully reduce impact shock to the muscle and arm joints of the users of golf clubs and also provide a feeling of tackiness between the player's hands and the grip. See, for example, U.S. Pat. No. 5,797,813 granted to Applicant on Aug. 25, 1998, U.S. Pat. No. 6,843,732 granted to Applicant on Jan. 18, 2005, and U.S. Pat. No. 6,857,971 granted to Applicant on Feb. 22, 2005.

Applicant has invented other grips in which different physical characteristics, including color, tackiness, and durometer, could be included by using separate panels or strips, each having different physical characteristics as desired. Color is also varied by adding a region of paint over the outer surface of the grip.

While such grips have continued to prove satisfactory in reducing impact shock, they allow for only limited display of decorative designs and limited placement of colors. Further, adding additional panels and/or inserts creates seams between the colors and increases the cost of manufacture. In addition, adding a region of paint over the outer surface of the grip creates regions on the surface, namely where the paint is positioned, with reduced tackiness and altered wear properties.

SUMMARY OF THE INVENTION

Embodiments of the golf club grip of the present invention provide a desired appearance without sacrificing tackiness, wear properties, slip resistance, and shock absorption properties. Desirably, a grip is formed from at least a sheet incorporating more than one color and/or other physical characteristic. Two or more polymers are combined wherein the polymers have one or more different characteristics. Though the polymers are combined, the different characteristics desirably remain separate and contrasting. The contrast of the characteristics may desirably create a pattern on the top surface of the grip. For example, embodiments of the present invention allow for the introduction of two or more colored polymers into a porous polymerized region exhibiting a pattern on its top surface defined by the different colors. Embodiments of the present invention also allow for the introduction of two or more polymers with different levels of tackiness, which, when combined, form a porous polymerized region where the different levels of tackiness create a pattern. Sheets made according to embodiments of the present invention may be formed into panels, strips, panels with cut-outs, or inserts for use in the various grip applications incorporated herein by reference.

Embodiments of the present invention can accommodate multiple color combinations, thus appealing to golfers and college programs who wish to display their school colors while playing the sport they love. Further, embodiments provide the opportunity to create a unique décor which may include random or semi-random patterns on the grips. Furthermore, embodiments of the present invention allow placement of materials with different characteristics in various areas. The choice of materials can be made to adjust various parameters of the grip, such as tackiness, feel, color, and/or durability.

BRIEF DESCRIPTION OF THE DRAWINGS

Further objects, features, and advantages of the invention will become apparent from the following detailed description taken in conjunction with the accompanying figures showing illustrative embodiments of the invention, in which:

FIG. 1 is a perspective view of a golf club provided with a grip according to one embodiment;

FIG. 2 is a front view of a grip according to one embodiment;

FIG. 8A is a SEM image at 100 times magnification of a cross-section of a sample sheet made according to a method of one embodiment;

FIG. 9A is a SEM image at 100 times magnification of a cross-section of a sample sheet made according to a method of the prior art;

FIG. 9B is a SEM image at 500 times magnification of a portion of the cross-section shown in FIG. 9A;

FIG. 10 is a partial schematic cross-sectional view taken along the line 10-10 in FIG. 6;

FIG. 11 is a partial schematic cross-sectional view of the sheet in FIGS. 9A and 9B;

FIG. 12 is a front view of a panel shaped grip interface of a grip according to one embodiment;

FIG. 13 is a side view showing a first longitudinal side of a panel being skived according to one embodiment;

FIG. 14 is a side view showing a second longitudinal side of a panel being skived parallel to the first side according to one embodiment;

FIG. 15 is a side view showing the top and bottom sides of a panel of one embodiment being skived anti-parallel to each other;

FIG. 16 is a front view of an underlisting sleeve of a grip according to one embodiment;

FIG. 17 is a vertical cross-sectional view taken along the line designated 17-17 in FIG. 16;

FIG. 18 is an enlarged view of the encircled area designated 18 in FIG. 17;

FIG. 19 is an enlarged view of the encircled area designated 19 in FIG. 17;

FIG. 20 is a rear view showing adhesive being applied to a panel of a grip according to one embodiment;

FIG. 21 is a front view showing adhesive being applied to the exterior of an underlisting sleeve according to one embodiment;

FIG. 22 is a rear view showing a panel being coupled to an underlisting sleeve according to one embodiment;

FIG. 23 is a rear view showing another step in a panel being coupled to an underlisting sleeve according to one embodiment;

Figure 3:
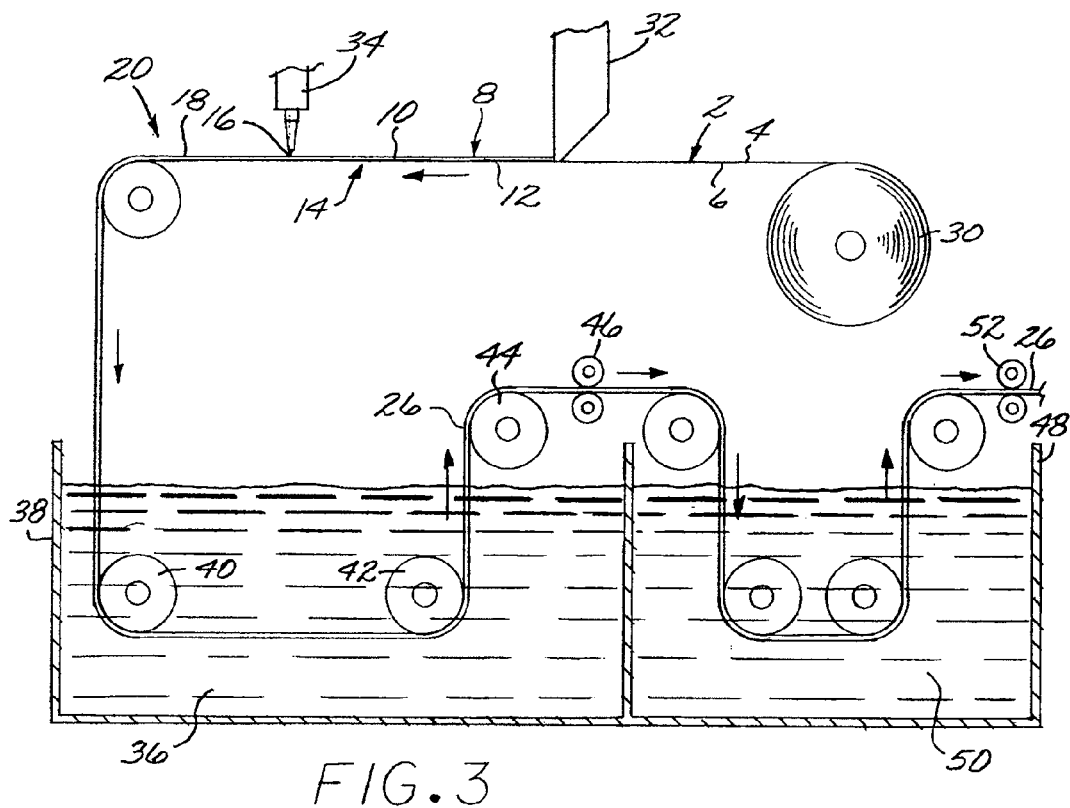
FIG. 3 is a schematic view showing a portion of a method of making a sheet according to one embodiment.

While embodiments will now be described in detail with reference to the figures, it is intended that changes and modifications can be made to the described embodiments without departing from the true scope and spirit of the subject invention as defined by the claims.

DETAILED DESCRIPTION

The terms top and bottom are used throughout the application in reference to elements on opposite sides from each other. For example, when describing the top end of a golf club grip, the term "top" is used to refer to that end which would be positioned farthest from the club head when the grip is installed on a club, i.e., the end closest to the golfer if that golfer were to be swinging or stroking the club. Similarly, when describing the bottom end of a grip, the term "bottom" is used to refer to that end which is furthest from the butt end of the club. When referring to surfaces, for example when describing the top surface of a region of polyurethane that will be used in a golf club grip, the term "top" is used to refer to the surface of the polyurethane which would be furthest from the shaft of the club when that grip is mounted. Similarly, when describing the bottom surface of the region, the term "bottom" is used to refer to the opposite surface, i.e. the surface closest to the shaft of the club.

Referring to the drawings, in FIG. 1 a grip G according one embodiment of the present invention is shown attached to the shaft S of a golf club C. The grip G shown in FIG. 2 is also made according to an embodiment of the present invention and includes a grip interface I having a pattern 28 and formed in the shape of a panel P (FIG. 12). Panel P is coupled to a resilient underlisting sleeve U (FIG. 16) to form grip G. Pattern as used herein is a broad term meaning a perceptual structure. Though the structure may include an arrangement of similar or identical parts, the parts need not be similar or identical. Visual patterns are understood to be those patterns that are capable of being seen by the naked eye. Other patterns may be structural and/or tactile arrangements.

Referring to FIG. 3, there is shown a method of forming a sheet 26. Referring to the upper right-hand portion of FIG. 3, there is shown a supply roll 30 of substrate 2. Substrate 2 has a top surface 4 and a bottom surface 6. In one embodiment, the substrate 2 includes a fabric, for example felt, which may include wool, polyester, nylon, or mixtures thereof. Preferably, the substrate 2 comprises a felt including nylon and polyester. From the supply roll 30, the substrate 2 is moved horizontally to the left below a first polyurethane dispensing machine 32. The first dispensing machine 32 preferably continually deposits a first region of liquid polyurethane 8, for example polyester or polyether dissolved in dimethyl formamide (DMF), onto the top surface 4 of the substrate 2 to form first web 14. The first dispensing machine 32 preferably uses a nozzle, sprayer, or the like to deposit the first polyurethane region 8 and preferably uses a blade to control the thickness of the first polyurethane region 8. The first polyurethane region 8 has a top surface 10 and a bottom surface 12.

As the first web 14 continues to the left from the first dispensing machine 32, a second polyurethane dispensing machine 34 deposits a second liquid polyurethane region 16 onto at least a portion of the top surface 10 of the first polyurethane region 8 to form second web 20. Second polyurethane region 16 has a top surface 18. This second web 20 is then moved into a water bath 36 contained in a first tank 38. As the second web 20 is immersed in the water bath 36, the urethanes 8 and 16 will coagulate so as to form a coagulated region 22 on substrate 2. The coagulated region 22 and substrate 2 cooperate to form sheet 26.

As is known, the coagulation time of the polyurethane will be determined by the desired thickness of the coagulated region 22, with a thin region requiring less time to coagulate than a thick region. In some embodiments, the coagulation process bonds the bottom surface 21 of coagulated region 22 to the top surface 4 of substrate 2 so as to fix the coagulated region 22 to the substrate 2. This bond interface 82 is shown in FIG. 8A. A pair of rollers 40 and 42 are positioned within the tank 38 to carry sheet 26 horizontally and then upwardly out of the water bath 36 over roller 44. Sheet 26 is then moved horizontally to the right between a pair of squeezing rollers 46. These squeezing rollers 46 compress the sheet 26 so as to force a major portion of the DMF disposed within the pores 24 downwardly through the substrate 2. Referring to FIG. 8A, the bottom end of a sufficient number of the pores are in contact with the top surface 4 of the substrate 2 to permit fluid flow from the pores through the substrate 2. Referring again to FIG. 3, the sheet 26 is then moved downwardly through one or more cleaning water bath tanks 48 (only one of which is shown), wherein the temperature of the water is sufficiently high to displace more DMF from the pores, with such DMF being replaced by the water 50 contained in the tank 48. From tank 48, the sheet 26 passes through another pair of squeezing rollers 52 to squeeze more of the DMF out of the pores to be replaced with water 50. In practice, it may be necessary to utilize four or five cleaning baths to remove a desired amount of DMF from the pores. From the last water bath, the sheet 26 is passed through a heating chamber (not shown) which drives out any water remaining within the pores 24 so that such water is replaced by air.

In another embodiment (not shown), the substrate 2 includes a flexible temporary support for the polyurethane during the wet coagulation process described above. Such a temporary support would be configured to be removed from the bottom surface 21 of coagulated polyurethane region 22 after sheet 26 is formed. In such an embodiment, bond interface 82 is desirably relatively weak to facilitate separation of the coagulated region 22 from the substrate 2. One preferred temporary support includes a smooth, flexible nylon cloth and is available from the Ho Ya Electric Bond Factory, Xin Xing Ind. Area. Xin Feng W. Rd., Shi Jie Town Dong Guan City, Guan Dong Province, China. Other materials include fluid-permeable textiles such as cotton or a synthetic cloth such as polyester. Preferably, the temporary support would have the fluid-passing characteristics and smooth top surface of nylon cloth allowing the DMF and water to be squeezed out of the polyurethane pores and allowing the coagulated polyurethane to be readily stripped off such temporary support. Removing substrate 2 from the coagulated polyurethane region 22 provides for use of the coagulated polyurethane region 22 alone or provides the opportunity to use an alternative substrate. For example, it is possible to replace the substrate 2 with a polymer region such as a region of ethylene-vinyl acetate (EVA). The EVA region may include an adhesive coating to bond the EVA region to the coagulated polyurethane region 22. EVA having an adhesive coating covered by a protective paper is sold by the aforementioned Ho Ya Electric Bond Factory.

Figure 4:
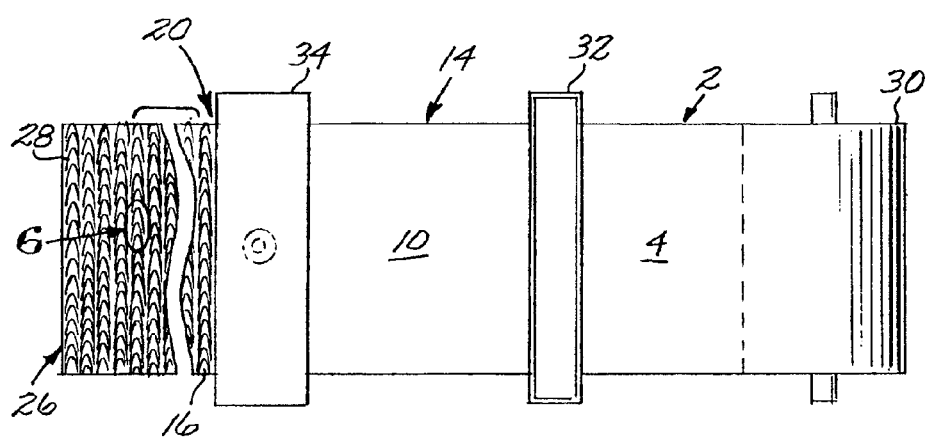
FIG. 4 is a top view of a portion of the schematic view shown in FIG. 3.
Figure 5:
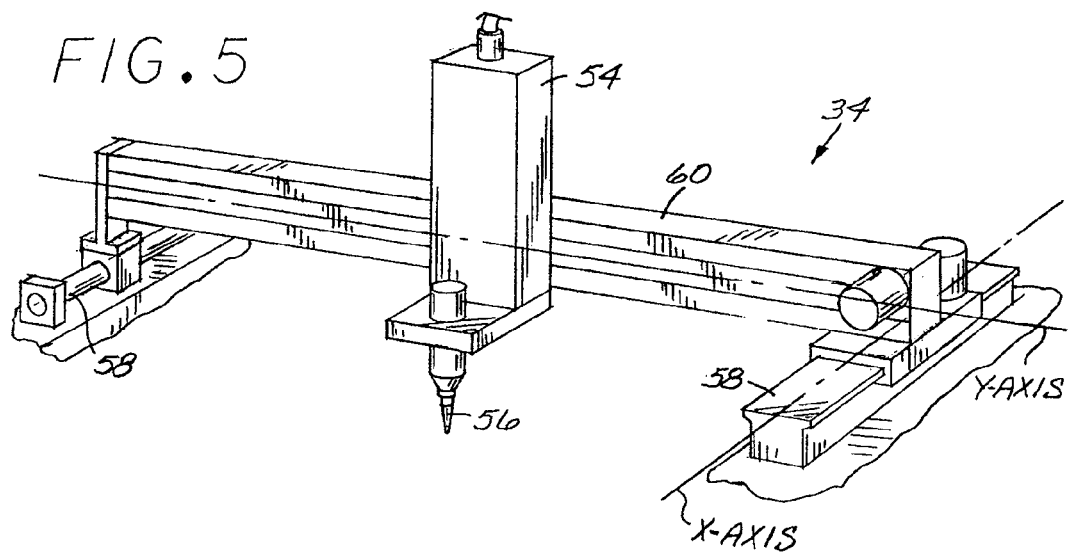
FIG. 5 is a schematic view showing an apparatus for use in a portion of a method of making a sheet according to one embodiment.

Referring now to FIG. 5, a schematic illustration of the second dispensing machine 34 is shown. In FIG. 5, dispensing machine 34 preferably includes a first housing 54 having a first dispensing nozzle 56. Housing 54 is connected to perpendicular rail 60 extending along the Y axis as illustrated. Rail 60, in turn, is connected to parallel rails 58 extending along the X axis as illustrated. Dispensing machine 34 is configured to allow the first web 14 of substrate 2 and first polyurethane region 8 to pass beneath nozzle 56, preferably at a constant pace, along the X axis (see FIGS. 3 and 4). The first polyurethane region 8 may provide a base region for the second polyurethane region 16. In some regions, the second polyurethane region 16 may extend completely through the first polyurethane region 8 to be in contact with substrate 2. Dispensing machine 34 is preferably further configured to move nozzle 56 in one or both of the X and Y directions. In addition, nozzle 56 may be configured to start and stop depositing the second polyurethane 16 as desired. The movement of the nozzle 56 in the X and Y directions and the start/stop feature of the nozzle 56 provides for the ability to create a unique appearance which may include random or semi-random patterns 28 in the second web 20 and, in turn, in sheet 26 (see FIG. 4). In other embodiments, the web 14 is moved beneath a stationary nozzle 56 to create a pattern. For example, nozzle 56 could be fixed along the X axis and the pace with which the web 14 is moved under the nozzle 56 can be varied. Similarly, nozzle 56 could be fixed along the Y axis and the web 14 be shifted along the Y axis instead. Alternatively, the nozzle 56 can be moved in both directions.

In other embodiments (not shown), dispensing machine 34 may include two, three, or more nozzles 54 for dispensing third, forth, etc. polyurethane regions. Such additional nozzles may be included in the same housing, separate housings, or a combination thereof. It is also possible to include additional dispensing machines on separate rails to introduce still further variation in the application of the polyurethane regions.

Figure 6:
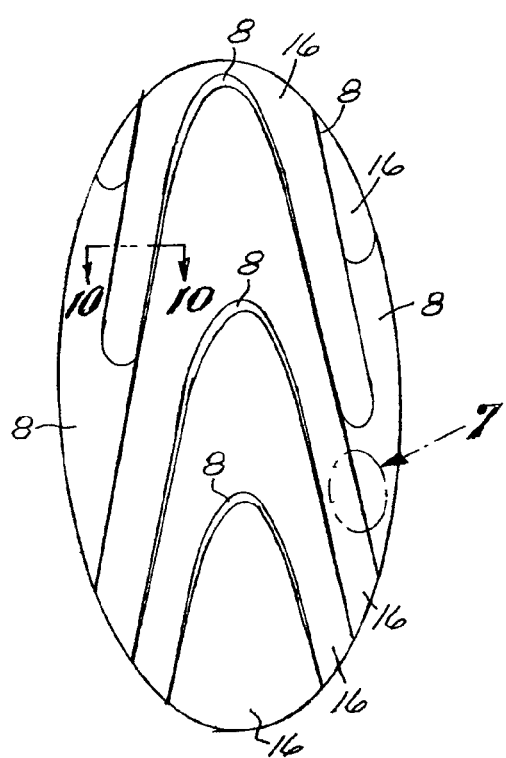
FIG. 6 is an enlarged view of the encircled area designated 6 in FIG. 4.

Referring now to FIG. 6, there is shown an enlarged view of the pattern 28 formed in the coagulated polyurethane region 22 of sheet 26. Generally, top surface 23 includes pattern 28 because the first polyurethane 8 and the second polyurethane 16 each include at least one contrasting characteristic. In the illustrated embodiment, the contrasting characteristic is color. However, other contrasting characteristics, or combinations thereof, could be incorporated to create the pattern such as contrasting durometers or levels of tackiness. In the figures, first polyurethane 8 defines a first color 70 and second polyurethane 16 defines a second color 72. As shown in greater detail in FIG. 7, the pattern 28 on the top surface 23 of coagulated region 22 includes a first region 78 and a second region 80 defined by the first color 70 of the first polyurethane 8 and the second color 72 of the second polyurethane 16, respectively.

As described above, the two polyurethanes 8 and 16 are coagulated in the first water bath 36 onto substrate 2. The application of the second polyurethane 16 onto a portion of the top surface 10 of the first polyurethane 8 prior to coagulation allows for the polyurethanes to mix and integrate below the top surface 10 of the first polyurethane region such that coagulation of the polyurethanes forms a single coagulated region 22 (see FIGS. 8A and 8B). Despite the mixing of the two polyurethanes prior to coagulation, and the integration of the two polyurethanes during coagulation, each of the polyurethanes substantially maintains its original characteristics. The contrast in one or more characteristics of the polyurethanes creates the pattern 28. Though the characteristics remain substantially distinct, there may be some blending along the interface of the two polyurethanes.

In the illustrated embodiment, the top surface 10 of first polyurethane region 8 cooperates with the top surface 18 of the second polyurethane region 16 to form substantially smooth top surface 23 of the coagulated region 22. Contrasting colors 70 and 72 on surface 23 cooperate to create the pattern 28. If the first polyurethane is red and the second polyurethane is white, the process discussed above would result in a coagulated polyurethane region with distinct red and white regions, rather than a single blended pink region. Though the contrasting characteristics of the first 8 and second 16 polyurethanes remain substantially distinct, the polyurethane structure below the top surface 23 is preferably seamless between the different polyurethanes with a preferably continuous pore structure throughout (see FIGS. 8A and 8B).

Figure 7:
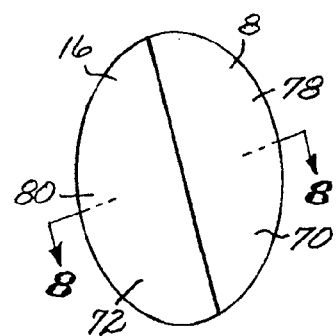
FIG. 7 is an enlarged view of the encircled area designated 7 in FIG. 6.

FIG. 8A is a 100 times magnification of a cross-section of a sample coagulated sheet 26 taken along the Line 8-8 in FIG. 7. FIG. 8A shows substrate region 2, in the sample a polyester nylon felt, with its top surface 4 bonded to the bottom surface 21 of coagulated polyurethane region 22 along bond interface 82. Top surface 23 is generally smooth. The structure is desirably seamless on both the top surface 23 between first region 78 and second region 80 and inside the coagulated region 22 where first polyurethane 8 interfaces with second polyurethane 16. It is apparent that the structure is not just seamless and not just coagulated, but the two polymers polymerize with each other to form the coagulated region 22. Accordingly, in the illustrated embodiment the coagulated region 22 is a polymerized region. Coagulated region 22 preferably further includes a plurality of generally vertically extending pores 24, a top surface 23, and a bottom surface 21. The pores 24 generally form throughout coagulated region 22 including in the regions where the first polyurethane 8 interfaces with the second polyurethane 16 between the top 23 and bottom 21 surfaces. Though polyurethane is preferred to form the coagulated region, other liquid polymers having contrasting characteristics may be used. Generally, the polymers will be combined while in their liquid states and allowed to polymerize together. As the polymers polymerize together, the structure of the polymerized region 22 will preferably be seamless while maintaining the contrasting characteristics at least on the outer surface 23 of the polymerized region 22.

Figure 8B:
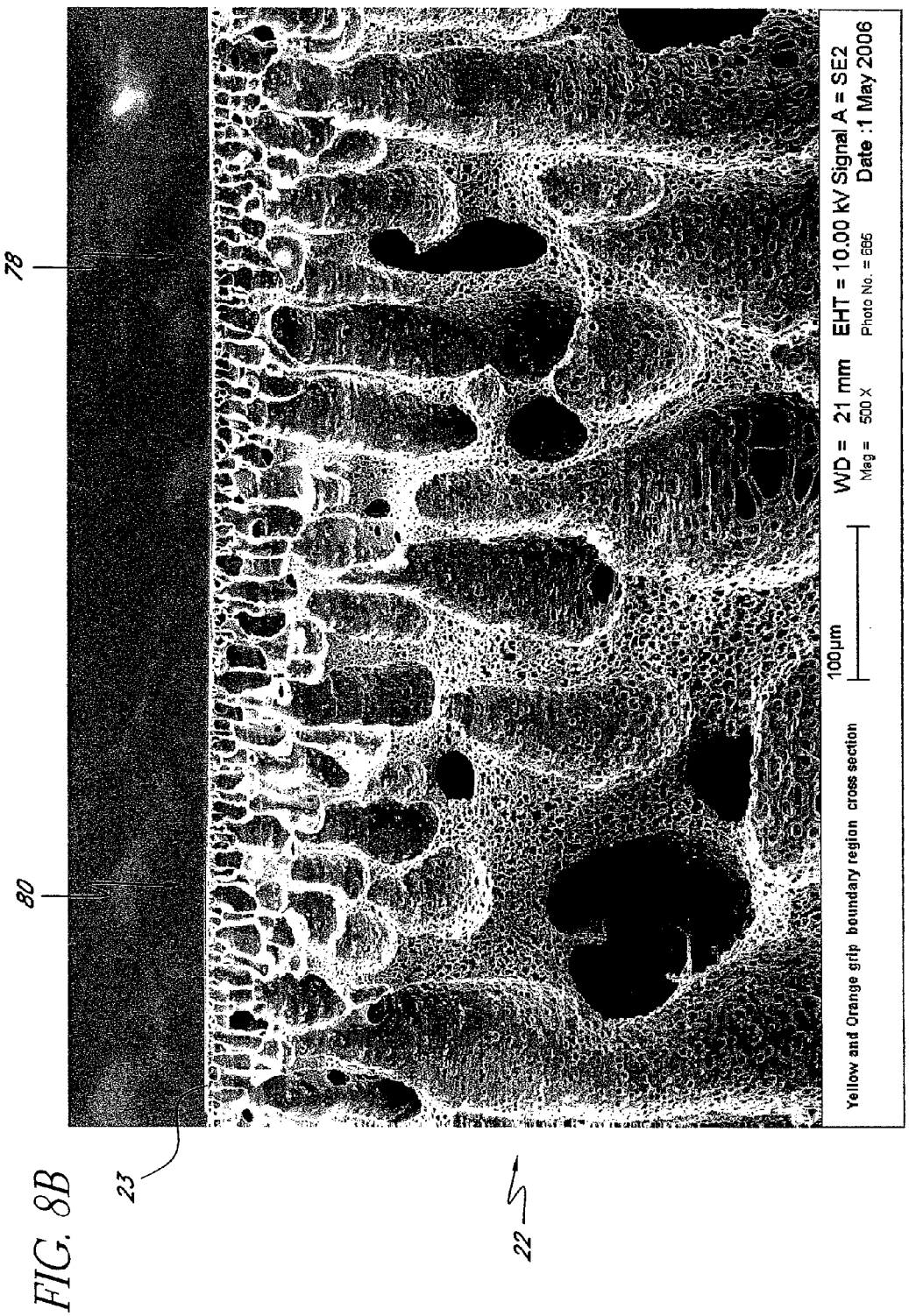
FIG. 8B is a SEM image at 500 times magnification of a portion of the cross-section shown in FIG. 8A.
Figure 24:
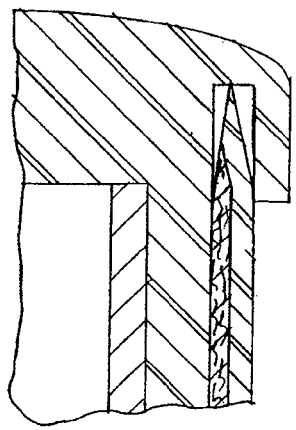
FIG. 24 is a partial cross-sectional view taken along the line designated 24-24 in FIG. 23.
Figure 25:
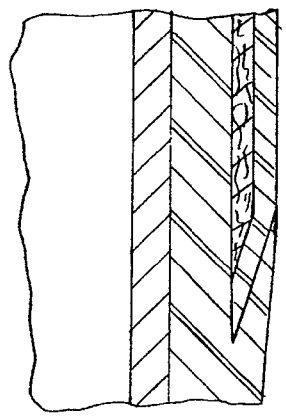
FIG. 25 is a partial cross-sectional view taken along the line designated 25-25 in FIG. 23.
Figure 26:
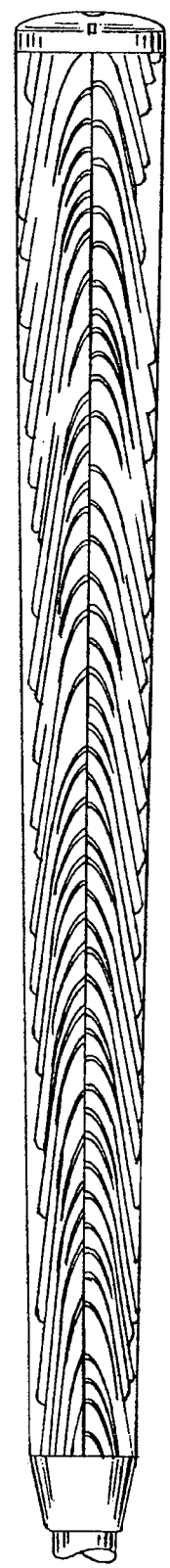
FIG. 26 is a rear view of a panel coupled to an underlisting sleeve according to one embodiment.

FIG. 8B is a 500 times magnification of a portion of the cross-section shown in FIG. 8A. As is apparent from the figures, the first 8 and second 16 polyurethanes are coagulated together to form coagulated region 22 with a substantially seamless structure between the first color region 78 and second color region 80 and between the polyurethanes inside the coagulated region 22.

FIGS. 8A and 8B may be contrasted with a prior art method of using paint to create a sheet with multiple colors, as shown in FIGS. 9A and 9B. In the prior art, a single polyurethane region 108 is coagulated onto a substrate 102 to form sheet 126 including coagulated region 122. To achieve regions of different color, paint 198 having a top surface 199 and a bottom surface 197 was applied to the top surface 123 of the coagulated polyurethane region 122 where desired. The polyurethane was coagulated prior to application of the paint and the paint forms a thin separate region over the surface of the sheet.

The prior art method of coating a coagulated region of polyurethane 122 with paint 198 alters the characteristics of the sheet 126. As shown in FIG. 9A and in greater detail in FIG. 9B, the paint 198 did not integrate with the polyurethane region 108. Rather, the bottom surface 197 of paint 198 bonds to the top surface 123 of polyurethane region 108. In embodiments known to the Applicant, the paint coating the surface had different tactile characteristics from the polyurethane it coated, including different levels of tackiness or durometer. For example, painted grips are generally less tacky in the region covered by paint than in the unpainted regions of polyurethane. In addition, during use, the paint on the polyurethane may wear off giving the grip a weathered or worn appearance. Though valuable and unique, Applicant's other solutions for introducing contrasting characteristics (including the use of multiple sheets, strips, or inserts) result in seams between the various components.

Embodiments of the present invention allow for the manufacture of grips having regions of contrasting characteristics wherein the structure of the region is seamless. For example, a red polyurethane having a desired level of tackiness and durometer may be used in conjunction with a blue polyurethane having the same desired level of tackiness and durometer. The sheet formed from the two materials would include a uniquely colored pattern and a seamless structure having a substantially uniform level of tackiness and durometer.

Referring now to FIG. 10, there is shown a partial schematic cross-sectional view of sheet 26 taken along the line 10-10 in FIG. 6. Contrasting regions 78 and 80 are visible on top surface 23. Due to the movement of nozzle 56 relative to web 14 during the application of the second polyurethane 16 onto the top surface 10 of the first polyurethane 8, as discussed above, differing amounts of the second polyurethane 16 are applied in different areas or regions. As the polyurethanes mix, second polyurethane 16 settles into first polyurethane 8.

After the water bath 36, coagulated region 22 defines a total depth $D_{PolyT}$ between its top surface 23 and its bottom surface 21. In various regions, second polyurethane 16 extends from the top surface 23 into the coagulated region 22 to a depth $D_{Poly2}$. The ratio of $D_{Poly2}$ to $D_{PolyT}$ may vary, depending on a number of factors including the speed with which the web 14 passes below the nozzle 56, the flow rate of the second polyurethane 16 from the nozzle 56, and the rate of movement of the nozzle 56 in the X and Y directions. In some embodiments, the maximum and, preferably, the average ratio of $D_{Poly2}$ to $D_{PolyT}$ in some regions is at least 1 to 15, 1 to 10, 1 to 5, 1 to 4, 1 to 3, and/or 1 to 2. In some regions, the ratio is 1 to 1 where the second polyurethane 16 extends from the top surface 23 to the bottom surface 21. In some embodiments, the ratio varies in different regions of the sheet 26.

As discussed above, coagulated region 22 is generally porous. This porous region has a total depth $D_{PorousT}$ between the top surface 23 and the bottom surface 21 of coagulated region 22. In various regions, the second polyurethane 16 extends from the top surface 23 into the porous coagulated region 22 to a maximum depth $D_{Porous2}$. The ratio of $D_{porous2}$ to $D_{porousT}$ may vary. In some embodiments, the maximum and, preferably, the average ratio of $D_{Porous2}$ to $D_{PorousT}$ in some regions is at least 1 to 50, 1 to 40, 1 to 30, 1 to 20, 1 to 15, 1 to 10, 1 to 5, 1 to 4, 1 to 3, and/or 1 to 2. In some regions, the ratio is 1 to 1 where the second polyurethane 16 extends through the porous coagulated region 22 from the top surface 23 to the bottom surface 21. In some embodiments, the ratio varies in different regions of the sheet 26.

The pattern 28 shown in the figures is an example of the patterns achievable with Applicant's method of making the polyurethane sheet. Other patterns are also possible. For example, in some embodiments, nozzle 56 is held steady as second polyurethane 16 is applied to web 14 to create a solid band of second polyurethane 16 across the upper surface 10 of first polyurethane 8. Depending on how the sheet 26 is formed into grip interface I, the band may extend horizontally, vertically, or at an angle on the grip interface I.

In some embodiments, top surface 10 of the first polyurethane region 8 forms substantially all of the top surface 23 of coagulated region 22. In such embodiments, relatively smaller quantities of second polyurethane 16 may be applied prior to the coagulation process. In other embodiments, top surface 18 of the second polyurethane 16 forms substantially all of the top surface 23 of coagulated region 22. In such embodiments, relatively large quantities of second polyurethane 16 may be applied prior to the coagulation process. Embodiments of the present invention may include different regions of similar patterns. In some, the pattern may be repeated and positioned such that a grip interface I formed from the sheet includes at least three regions having contrasting characteristics, such as colors. In some embodiments, a grip interface I may be formed with at least 5 regions of contrasting characteristics. In some, there may be at least 7 regions of contrasting characteristics. In some, there may be 10 or more regions of contrasting characteristics. These regions of contrasting characteristics may be arranged throughout the top surface 23 of the coagulated region 22 of the grip interface I, whether across the width of the grip interface I, along the length of grip interface I, or in a combination of the two.

Referring now to FIG. 11, there is shown a partial schematic cross-sectional view of the sheet 126 shown in FIGS. 9A and 9B. Coagulated region 122 is porous and includes a generally smooth top surface 123 and a bottom surface 121. Top surface 123 may include one or more irregularities 125 which may extend downward into coagulated region 122. Paint 198 is applied over the top surface 123 of coagulated region 122. Due to the irregularities 125 in the top surface 123 of coagulated region 122, paint 198 may extend into coagulated region 22 to a depth $D_{Porous2}$. Though unclear, the ratio of $D_{Porous2}$ to $D_{PorousT}$ shown in FIG. 9B appears to be no more than 1 to 100. Thus, if the paint was a second polymer applied to the surface of a coagulated region, the ratio of $D_{Porous2}$ to $D_{PorousT}$ of a paint covered sheet is far from the 1 to 50 ratio discussed above.

As shown in FIG. 12, sheet 26 may be formed into a grip interface I. Grip interface I is shown in the shape of a panel P. Preferably, panel P is die cut from sheet 26. As will be understood by those of skill in the art, sheet 26 may be formed into any of a number of shapes, including strips, panels, inserts, or panels with cut-outs.

Panel P includes top surface 74, a top side 84, a bottom side 86, a first side 88, and a second side 90. A line drawn from top side 84 to bottom side 86 on at least a portion of top surface 74 preferably crosses multiple regions of polyurethane having a different characteristic. In some embodiments, grip interface I, in the shape of a panel P or a different shape, may include at least 2, at least 3, at least 5, at least 7, or at least 10 regions having a different characteristic along the line drawn from top side 84 to bottom side 86 on at least a portion of top surface 74. In some embodiments, grip interface I may include in the range of between 2 and 500 regions of at least one different characteristic along the line. It should be understood that the different characteristics of the regions may be alternating two or more colors along the line. Alternatively, the different characteristics of the regions may be alternating levels of tackiness or durometer along the line.

Similarly, a line drawn from first side 88 to second side 90 on at least a portion of top surface 74 also will preferably cross multiple regions having different characteristics. In some embodiments, grip interface I may include at least 2, at least 3, at least 5, at least 7, or at least 10 regions having a different characteristic along the line drawn from first side 88 to second side 90 on at least a portion of top surface 74. In some embodiments, grip interface I may include in the range of between 2 and 500 regions of at least one different characteristic along the line.

Likewise, a line drawn into panel P from the top surface 74 to the bottom surface 21 of coagulated region 22 may cross multiple regions. In some embodiments, grip interface I may include at least 2, at least 3, at least 5, at least 7, or at least 10 regions having different characteristics along the line drawn from the top surface 74 to the bottom surface 21 of coagulated region 22. In some embodiments, grip interface I may include in the range of between 2 and 50 regions of at least one different characteristic along the line.

As shown in FIGS. 13-15, the sides of panel P are preferably skived. It will be noted from FIGS. 13 and 14 that the skiving on the first and second sides of panel P are preferably parallel to one another. Such a configuration of skiving may be advantageously used to form a substantially longitudinal overlapping intersection of the first and second skived longitudinal sides. Alternatively, first and second sides of panel P may be skived anti-parallel in a similar manner to the skiving of top and bottom sides of panel P shown in FIG. 15. With anti-parallel longitudinal side edges, the substantially longitudinal intersection may be formed by over lapping the edges. Alternatively, the intersection may be sewn or otherwise joined.

Generally, the top surface 74 of the panel P is in direct contact with the hand of the user using a grip G. However, as one of skill in the art would appreciate, an additional coating region over the panel P may be included. It should be understood that the top surface of a grip embodying the present invention may also be coated, in whole or in part, by means of a brush, nozzle, spray, or the like with a thin region of polyurethane and/or other material (not shown) to protect such surface, add tackiness thereto, and/or increase the durability thereof. The additional coating region is preferably transparent, or semi-transparent, such that some or all of any visual pattern on the outer surface of the panel P created by contrasting characteristics of the multiple polyurethanes in the coagulated region 22 remains visible. The additional coating region may be somewhat opaque, as long as a portion of the panel P is observable through the additional coating region. The additional coating region may be incorporated into a previously formed grip G or may be applied to the panel P prior to attachment to the underlisting sleeve U. If used, the additional coating region would be in direct contact with the user's hand rather than the top surface of the grip. However, even when an additional coating region is included, the top surface of the panel P is considered to be the top surface of the grip G.

Panel P may be further enhanced with a friction enhancing pattern as shown, for example, in Applicant's U.S. Pat. Nos. 6,843,732 and 6,857,971. If an additional coating region is included over the top surface of the grip, this region may also be further enhanced with a friction enhancing pattern. In addition to being attached to an underlisting sleeve U configured for use with irons, as shown in FIGS. 16-26, panel P may also be attached to a sleeve configured for use with putters (not shown). Such a putter sleeve may include a substantially flat region as shown, for example, in Applicant's U.S. Pat. Nos. 6,843,732 and 6,857,971.

Many individual golfers and high school, college, and professional teams like the camaraderie and unification that can be achieved by putting team colors on their golf grips without sacrificing comfort, durability, or tackiness because of paint embossment. These embodiments allow the application of the multiple colors to golf club and putter grips to allow these teams and individuals to express their spirit and enthusiasm in a way never before possible. Multiple colors or other contrasting characteristics can be combined in a seamless construction.

It will be understood that the foregoing is only illustrative of the principles of the invention, and that various modifications, alterations, and combinations can be made by those skilled in the art without departing from the scope and spirit of the invention.

What is claimed is:

1. A method of making a single layer of polymer for use with a grip, the method comprising the steps of:
   providing a substrate;
   providing a first liquid polymer;
   applying the first liquid polymer onto the substrate;
   providing a second liquid polymer;
   applying the second liquid polymer in a pattern onto the first liquid polymer before said first liquid polymer is polymerized; and
   polymerizing the first and second liquid polymers by immersing the first and second polymers in a bath to form a single layer of polymerized polymer having a top surface opposite the substrate, wherein the top surface of the single layer of polymerized polymer includes at least a portion of both the first and second polymers polymerized together side by side.

2. A method as in claim 1, wherein the step of providing the first liquid polymer further comprises providing a first liquid polymer having a first color and the step of providing the second liquid polymer further comprises providing a second liquid polymer having a second color different than the first color of the first liquid polymer.

3. A method as in claim 1, wherein the step of providing the first liquid polymer further comprises providing a first liquid polymer having a first level of tackiness and the step of providing the second liquid polymer further comprises providing a second liquid polymer having a second level of tackiness different than the first level of tackiness of the first liquid polymer.

4. A method as in claim 1, wherein the step of providing the substrate further comprises providing a substrate comprising fabric and the polymerization step bonds the single layer of polymerized polymer to the fabric to form a sheet.

5. A method as in claim 4, further comprising the step of forming a panel from the sheet.

6. A method as in claim 4, further comprising the step of forming a strip from the sheet.

7. A method as in claim 1, wherein the step of applying the second liquid polymer further comprises spraying the second liquid polymer from a spraying apparatus.

8. A method as in claim 7, wherein the step of spraying the second liquid polymer further comprises the step of moving the spraying apparatus relative to the first liquid polymer during the application of the second liquid polymer.

9. A method as in claim 8, wherein the step of moving the spraying apparatus further comprises moving the apparatus in a pattern generally corresponding to the pattern created by the application of the second liquid polymer and onto the first liquid polymer.

10. A method as in claim 1, further comprising the step of removing the substrate from the single layer of polymerized polymers.

11. A method as in claim 10, further comprising the step of bonding the single layer of polymerized polymer to a layer of EVA to form a sheet.

12. A method as in claim 11, further comprising the step of forming a panel from the sheet.

13. A method as in claim 11, further comprising the step of forming a strip from the sheet.

\* \* \* \* \*